UNITED STATES PATENT OFFICE.

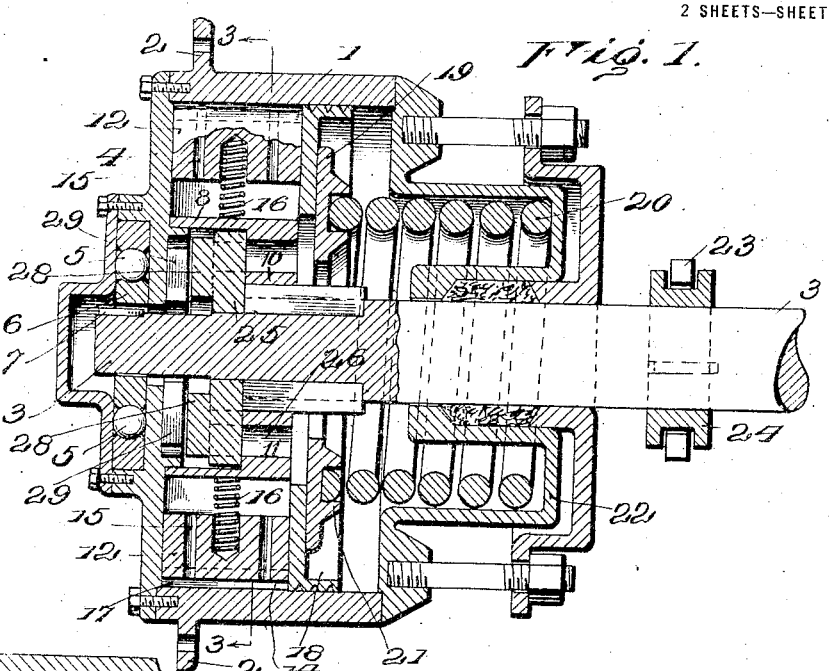

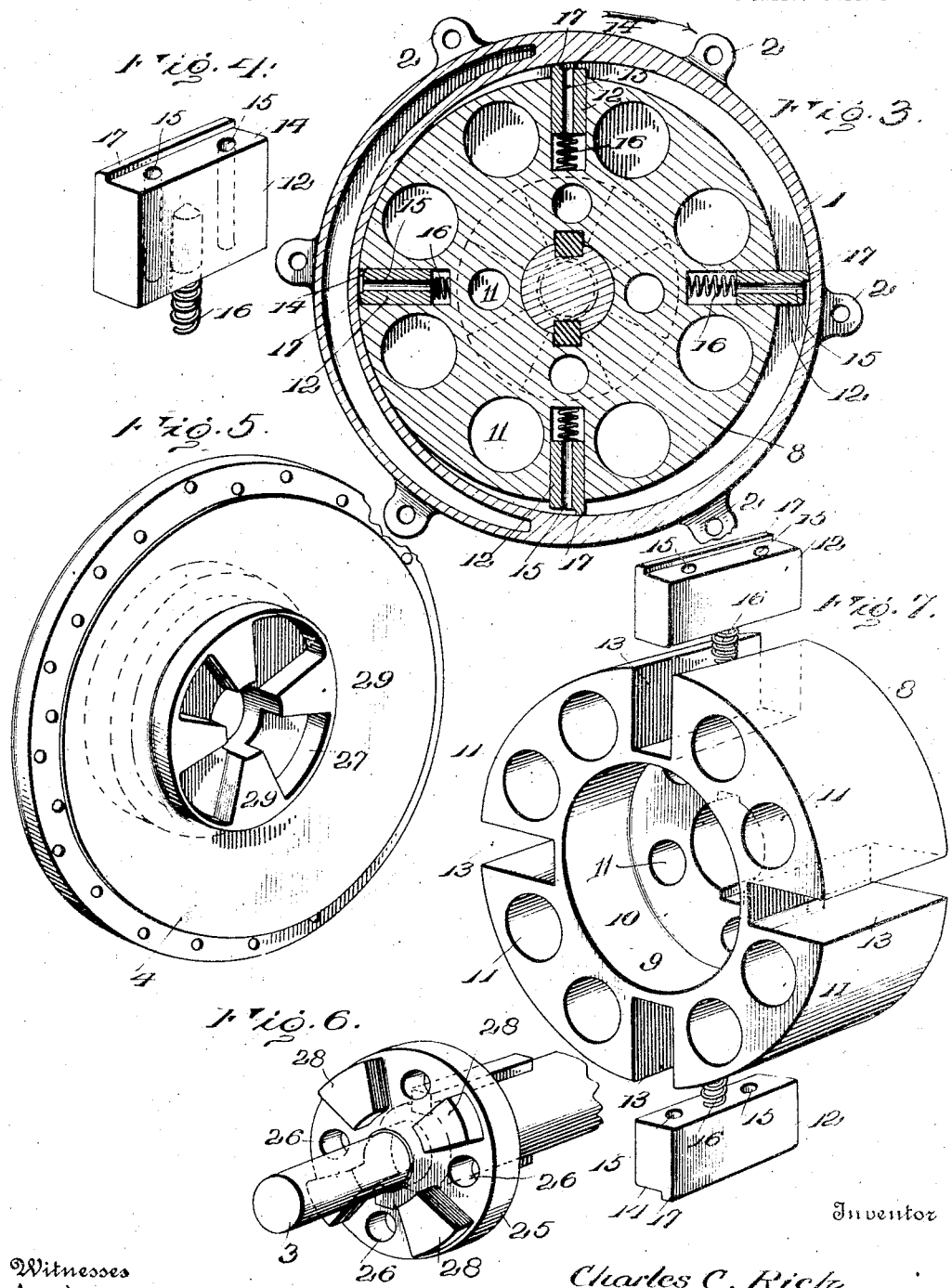

CHARLES CLAYTON RICH, OF MOUNT VERNON, NEW YORK, ASSIGNOR TO THE HYDRO-KINETIC TRANSMISSION COMPANY, A CORPORATION OF MAINE.

CLUTCH.

1,156,819.  Specification of Letters Patent.  Patented Oct. 12, 1915.

Application filed October 9, 1911. Serial No. 653,681.

*To all whom it may concern:*

Be it known that I, CHARLES CLAYTON RICH, citizen of the United States, residing at Mount Vernon, in the county of Westchester and State of New York, have invented certain new and useful Improvements in Clutches, of which the following is a specification.

This invention comprehends certain new and useful improvements in clutches of the fluid type, and the invention has for its primary object a simple, durable and efficient construction of device of this character which will be composed of comparatively few parts that may be easily manufactured and assembled and which will be efficient in operation to transmit power from a drive shaft to a driven shaft to rotate the latter within a wide range of gradations of speed from the lowest to the highest of which the engine rotating the drive shaft is capable.

The invention also has for one of its main objects to provide a clutch of the type above specified which will be compact and not liable to get out of order, the device embodying a rotor casing for the rotor devoid of inlet and outlet ports, and means whereby at one limit of movement of the rotor in the casing, longitudinally of the driven shaft that carries the rotor, there will be a space for the free circulation of the fluid between one face of the rotor and the adjoining face of the casing, the longitudinal movement of the rotor toward such face constricting such space and gradually increasing the compression of the fluid against the active faces of the rotor blades, whereby the movement of the drive shaft will be gradually picked up by the driven shaft until the two shafts are rotating at the same speed.

The invention also has for an object the provision of a clutch of this type so designed that the rotor casing may, if desired, be bolted or otherwise secured directly to a webbed fly wheel which will in that event constitute one of the heads of the casing in which the rotor is mounted, the device in this regard being especially applicable for use in connection with automobiles and other motor-driven vehicles.

The invention also has for one of its objects an improved clutch of the fluid type in which the parts are so arranged that after the rotor and its shaft have been shifted longitudinally in a direction to hydraulically connect the rotor casing and rotor, the shaft may be continued in such movement independent of the rotor to bring into interengagement jaws that are carried by the casing and shaft, respectively, so as to mechanically connect the drive and driven shafts directly together, thereby entirely relieving the rotor and rotor casing of the stress of transmission of power.

With these and other objects in view, as will more fully appear as the description proceeds, the invention consists in certain constructions, arrangements and combinations of the parts as I shall hereinafter fully describe and claim.

For a full understanding of the invention, reference is to be had to the accompanying drawings in which—

Figure 1 is a longitudinal sectional view of a clutch embodying the improvements of the present invention; Fig. 2 is a similar view showing the use of the engine fly wheel as one of the heads of the casing for the rotor, the driven shaft in Fig. 2 being shown in a different position from the driven shaft in Fig. 1; Fig. 3 is a transverse sectional view of the device, the section being taken approximately on the line 3—3 of Fig. 1. Fig. 4 is a detail perspective view of one of the gates of the motor; Fig. 5 is a perspective view of one embodiment of one of the jaws designed to directly and mechanically connect the drive and driven shafts; Fig. 6 is a similar view of the complementary jaw, and Fig. 7 is a detail perspective view of the rotor and two of its gates, shown detached therefrom and in juxtaposition thereto.

Corresponding parts are designated by like characters of reference throughout the several views.

In that embodiment of the invention illustrated in Fig. 1, the numeral 1 designates a rotor casing which is preferably provided with lugs 2 whereby it may be bolted or otherwise secured to a driving element, either directly or indirectly, the casing 1 rotating with the shaft and constituting part of the rotary driving element of the device.

3 designates the driven shaft, which is preferably, although not necessarily, extended to and journaled in the casing head 4, a ball bearing 5 being preferably provided for said shaft. In the present instance, the driven shaft 3 is splined in the inner raceway 6 of said ball bearing, the spline or feather being indicated at 7.

A rotor 8 is splined on the driven shaft 3 to turn therewith, said rotor being formed in one side with a centrally disposed chamber 9, said chamber being defined on one side by a hub portion 10 and opening at its other side toward the inner face of the head 4. It is, of course, to be understood that the casing 1 contains oil or other fluid medium, and hence the main portion of the rotor 8 and preferably also the hub portion 10 thereof, is formed with longitudinal openings 11 extending entirely therethrough, any desired number of these openings being employed. By providing these openings or passages 11, all pocketing or cushioning is prevented and the ease of operation of the rotor in its longitudinal movement is insured.

The rotor 8 carries any desired number of gates 12, there being four of these in the present embodiment of the invention, said gates being mounted for radial movement in peripheral recesses 13. Preferably, each gate is formed on its outer edge with a recess 14 merging into the front or pressure face of the gate, as best illustrated in Fig. 3, where the direction of rotation is indicated by an arrow, and each of said recesses 14 communicates with the inner edge of the gate by means of radially extending openings 15. Helical springs 16 are seated back of the gates 12, tending to press them outwardly against the wall of the casing 1. By providing the recesses 14 and openings 15 it is manifest that the outward pressure of the gates on the wall of the casing may be properly balanced, so as to avoid excessive wear, the preferably rounded ribs 17 formed on the outer edges of the gates being of sufficient thickness to prevent leakage at these points.

Mounted within the casing 1 and abutting against the rotor 8 on the side thereof distant from the chamber 9, is a plate 18 which is entirely free from rigid connection with the casing, being capable of both a longitudinal and a rotary movement. The disk 19 bears against the outer face of the preferably flanged plate 18, and a coiled expansion spring 20 is mounted in the casing 1 and bears against the outer face of the disk 19, the inner end of said spring being preferably seated in an annular groove formed in such face, as indicated at 21. The outer end of the spring 20 reacts against the casing head 22, the latter being provided with a stuffing box, as shown. The tension of the spring 20 upon the disk 19 and plate 18 is in a direction to move the rotor 8 toward the head 4. To move the rotor in the opposite direction, any external device may be employed, such as a shipper lever, the yoke of which is indicated at 23, engaging a grooved collar 24 formed on or secured to the driven shaft 3.

Mounted for longitudinal movement in the chamber 9 of the rotor 8 is a jaw 25 which is preferably formed integral with the driven shaft 3, although it is to be understood that it may be secured thereto in any desired way. This jaw is formed with any desired number of fluid displacement openings 26 and is designed for interlocking engagement with a complemental jaw formed on or secured in any desired way to the head 4 of the casing. In the present instance, this interlocking engagement is effected by lugs 28 formed on the jaw 25 and designed to slip in between corresponding lugs 29 formed on the jaw 27. When these two jaws are in engagement with each other, the driving element and driven shaft will, as is manifest, be directly and mechanically connected.

Any number and shape of interlocking lugs 28 and 29 may be employed, and, in fact, it is within the purview of my invention to form the two jaws in various ways, just so long as they are capable of interlocking when one is moved into engagement with the other.

In describing the operation of my improved clutch, attention is first directed to the fact that the longitudinally movable driven shaft 3 is capable of a limited longitudinal movement independent of the rotor 8. In the relative position of the parts illustrated in Fig. 2, the said shaft 3 has been moved to the left to the limit of its movement in that direction so as to effect the engagement of the jaws 25 and 27, there being a direct mechanical connection between the rotary element and the driven shaft. In the movement to release the clutch against the tension of the expansion spring 20, the initial movement of the parts will result in a longitudinal movement of the shaft 3 by itself, until the jaw 25 reaches the inner end of the chamber 9, whereupon the movement of the shaft 3 in that direction will be accompanied by a corresponding movement of the rotor 8, which will recede from the head 4 of the casing, the plate 18 being pressed backwardly in an evident manner. This movement of the rotor, as is evident, will produce a space between the head 4 of the casing and the adjoining side of the rotor, in which space the fluid will be entirely free to circulate, whereby at the extreme limit of the rotor in the direction just mentioned, a race-way will be provided within the casing 1 so as to permit the free circulation of the fluid and consequently the movement of the rotating casing 1 will not be imparted to the driven shaft 3, the latter remaining stationary or idly revolving should, for instance, the vehicle in which the device is incorporated, be coasting.

We will now assume that the clutch has been thrown out and that it is desired to transmit the movement of the rotary element to the driven shaft. To accomplish this, it is only necessary to gradually release the foot pedal or the like with which devices of this character are ordinarily provided, whereupon the spring 20 will be permitted to act against the disk 19 and plate 18 to move the rotor 8 forward or to the left, as viewed in Figs. 1 and 2, the space between the head 4 and adjoining face of the rotor being gradually constricted and the liquid being thereby compelled to move between the inner wall of the casing 1 and the gates of the rotor eccentrically mounted in said casing, the rotary motion of the driven element being thereby gradually picked up by the rotor and transmitted thereby to the driven shaft. When the parts are in the position illustrated in Fig. 1, with the rotor abutting against the head 4, it is obvious that the parts will be hydraulically connected and that the driven shaft will be compelled to rotate at substantially the same speed as the driving element. At this point, it will be understood that a continued movement of the shaft 3 toward the left is possible, such independent movement effecting the interengagement of the jaws 26 and 27, the members being then in the position illustrated in Fig. 2 and the rotor being thereby relieved entirely of all stress in the transmission of power. This independent movement of the driven shaft 3 in a direction to effect the mechanical connection just mentioned may be produced by any external means, such as a relatively weak spring, or other accessory.

As set forth at the outset of the specification, I propose in some instances, especially in the use of the invention in connection with motor vehicles, to employ the fly wheel of the internal combustion engine as one head of the casing 1—that head which corresponds to the head 4 before mentioned. This arrangement of parts is illustrated in Fig. 2, where 4ᵃ designates the webbed fly wheel to which the casing 1 is connected by bolts 1ᵃ through the flanges 2. In this view 3ᵃ designates the drive shaft, on the end of which the fly wheel 4ᵃ is mounted.

From the foregoing description in connection with the accompanying drawings, it will be seen that I have provided a very compact, strong and efficient fluid pressure clutch in which there are no specially defined inlet and outlet ports leading to a race-way and to the rotor, or any means for partially or completely cutting off communication between such ports and the raceway, such as are provided in my prior patent, which was reissued to me June 20, 1911, Reissue No. 13260; that I have provided a very simple arrangement of parts whereby after the driven shaft has been hydraulically connected to the rotary driving element, a continued independent movement of said shaft can directly and mechanically connect said element and driven shaft; wherein the driven shaft, by being journaled at one end in the rotary driven element or head of the casing, whether such head be the fly wheel of the engine or a separate part, is protected against torsional strains, and wherein the gates of the rotor may be properly balanced so as to avoid excessive wear. It is, of course, to be understood that the casing 1 will be provided with suitable feeding and drain plugs, the same being omitted from the drawings, as they are merely mechanical features and not necessary to a full understanding of the invention; but in this connection it may be remarked that it is not necessary for the casing to be entirely filled with oil or other fluid medium, for the reason that even though it should not be quite full, the centrifugal action of the rapidly rotating parts will carry the fluid medium outwardly into its proper operative zone, and thereby render the device just as efficient as if the casing were entirely filled.

Having thus described the invention, what is claimed as new is:

1. A fluid pressure clutch, including a driven shaft, a rotor mounted thereon, a casing in which the rotor is eccentrically mounted and movable longitudinally, the line of shaft being considered, and means for moving said rotor toward and away from one head of the casing to compress the fluid between the circular wall of the casing and the rotor, upon the movement of the rotor longitudinally in one direction and to provide a free space for the circulation of the fluid between said head and the adjoining face of the rotor upon the longitudinal movement of the rotor in the opposite direction.

2. A fluid pressure clutch including a driven shaft, a rotor movable longitudinally thereon but compelled to turn therewith, the shaft being longitudinally movable, a casing in which the rotor is mounted, means tending to move the rotor in one direction in the casing, a jaw carried by the casing, and a jaw carried by the shaft, the shaft being movable independently of the rotor in a longitudinal direction to effect the engagement of the two jaws.

3. A fluid pressure clutch including a driven shaft, a rotor mounted thereon, a casing in which the rotor is mounted, means tending to move the rotor in a direction to hydraulically connect the rotor and casing, and means whereby a movement of the shaft longitudinally independent of the rotor will subsequently mechanically connect said shaft and casing.

4. In a clutch of the character described, the combination of a longitudinally movable driven shaft, a rotor mounted on said shaft, the shaft being capable of a limited longitudinal movement independent of the rotor, means for moving the rotor in a direction to hydraulically connect the rotor and casing, the rotor being compelled to turn with the shaft, and means for mechanically connecting the casing and shaft upon a continued movement of the shaft independently of the rotor.

5. A fluid pressure clutch including a driven shaft, a rotor splined thereon, a casing in which the rotor is mounted, the rotor being formed in one side with a chamber, means for moving the rotor in a direction to hydraulically connect the casing and rotor, a jaw carried by the casing, and a complemental jaw carried by the shaft and mounted for movement in said chamber, for the purpose specified.

6. A fluid pressure clutch including a driven shaft, a rotor splined thereon, a casing in which the rotor is mounted, a plate abutting against one side of the rotor, a spring mounted in the casing and exerting its tension to move the plate and rotor longitudinally of the driven shaft in a direction to hydraulically connect the casing and rotor, a jaw carried by the casing, and a jaw carried by the shaft and adapted to engage with the casing jaw upon the longitudinal movement of the driven shaft in one direction independently of the rotor.

7. A fluid pressure clutch including a driven shaft, a casing in which said shaft is journaled at one end and in which it is longitudinally movable, a rotor mounted in the casing and movable therein longitudinally of the shaft both with the shaft and independently thereof, means acting against the rotor to move the same longitudinally in a direction to hydraulically connect the casing and rotor, a jaw carried by the casing, and a complemental jaw carried by the shaft and arranged to be moved thereby into engagement with the casing jaw in an independent longitudinal movement of the driven shaft subsequent to the movement of the rotor to hydraulically connect said rotor with the casing.

8. A fluid pressure clutch comprising a casing, a rotor mounted in said casing and provided with a centrally disposed chamber opening toward one head of the casing, a shaft movable longitudinally in said casing and journaled therein, the rotor being mounted for a longitudinal movement on the shaft independently thereof but compelled to turn with the shaft, a jaw carried by the casing, and a complemental jaw carried by the shaft and mounted for a limited movement in said chamber, for the purpose specified.

9. A fluid pressure clutch including a shaft, a hollow clutch member mounted thereon and having radially disposed blades, a clutch member inclosing the first named clutch member and eccentrically disposed relative thereto, there being a fluid medium between the two clutch members, said hollow clutch member being longitudinally movable bodily within the second named clutch member, and means for moving the interior clutch member longitudinally relative to the outer clutch member to reduce the distance between adjacent end faces of the two members and thereby compress the fluid medium to cause a common rotation of the members.

10. A fluid pressure clutch including a driven shaft, a hollow clutch member mounted thereon, the shaft having longitudinal movement relative to the clutch member for a predetermined distance but engaging said clutch member to retract it after the shaft has moved outward a predetermined distance, a clutch member embodying a casing and inclosing the first named clutch member and eccentrically arranged relative thereto, the first named clutch member having outwardly pressed blades engaging the walls of the second named clutch member, the first named clutch member having means constantly urging the first named clutch member toward the end wall of the second named clutch member, and means on the shaft engageable with the first named clutch member to shift it outward and away from said wall upon a retraction of the shaft.

In testimony whereof I affix my signature in presence of two witnesses.

CHARLES CLAYTON RICH. [L. S.]

Witnesses:
W. N. WOODSON,
FREDERICK S. STITT.